United States Patent
Hoehn et al.

(10) Patent No.: US 9,084,945 B2
(45) Date of Patent: Jul. 21, 2015

(54) ENHANCED HYDROGEN RECOVERY

(71) Applicant: UOP LLC, Des Plaines, IL (US)

(72) Inventors: Richard K. Hoehn, Mt. Prospect, IL (US); Soumendra M. Banerjee, Dwarka (IN); Kiran Ladkat, Gurgaon (IN); Andrew J. Towarnicky, Chicago, IL (US); Brent M. Lemberg, San Antonio, TX (US)

(73) Assignee: UOP LLC, Des Plaines, IL (US)

( * ) Notice: Subject to any disclaimer, the term of this patent is extended or adjusted under 35 U.S.C. 154(b) by 170 days.

(21) Appl. No.: 13/970,040

(22) Filed: Aug. 19, 2013

(65) Prior Publication Data
US 2015/0047503 A1    Feb. 19, 2015

(51) Int. Cl.
| | | |
|---|---|---|
| *C01B 3/50* | (2006.01) | |
| *B01D 19/00* | (2006.01) | |
| *C01B 3/52* | (2006.01) | |
| *B01D 53/14* | (2006.01) | |
| *B01D 53/047* | (2006.01) | |

(52) U.S. Cl.
CPC .......... *B01D 19/0036* (2013.01); *B01D 53/047* (2013.01); *B01D 53/145* (2013.01); *B01D 53/1418* (2013.01); *C01B 3/52* (2013.01)

(58) Field of Classification Search
CPC ............. B01D 19/0036; B01D 53/047; B01D 53/1418; B01D 53/145; C01B 3/508; C01B 3/52
USPC ............... 95/92, 96, 158, 172, 236, 247, 258; 423/248, 648.1
See application file for complete search history.

(56) References Cited

U.S. PATENT DOCUMENTS

| | | | |
|---|---|---|---|
| 3,607,726 A | 9/1971 | Hallman et al. | |
| 3,988,425 A | 10/1976 | Jockel et al. | |
| 4,212,726 A | 7/1980 | Mayes | |
| 5,332,492 A * | 7/1994 | Maurer et al. | 208/340 |
| 5,597,404 A * | 1/1997 | Domergue et al. | 96/134 |
| 6,740,226 B2 | 5/2004 | Mehra et al. | |
| 7,259,288 B2 | 8/2007 | Khan | |
| 2003/0057136 A1 | 3/2003 | McIntush et al. | |
| 2007/0017851 A1 | 1/2007 | Mehra et al. | |
| 2009/0321310 A1 | 12/2009 | Kokayeff et al. | |
| 2010/0152900 A1 | 6/2010 | Gurciullo et al. | |

(Continued)

OTHER PUBLICATIONS

Mehra et al., Hydrogen Purification in Hydroprocessing (HPH Technology), Annual Meeting, San Francisco, CA, Mar. 13-15, 2005, pp. 1-12.

Alhajree et al., "Modeling and optimization of an industrial hydrocracker plant," Journal of Petroleum Science adn Engineering 78 (2011) pp. 627-636.

(Continued)

*Primary Examiner* — Frank Lawrence
(74) *Attorney, Agent, or Firm* — James C. Paschall

(57) ABSTRACT

A process for recovering hydrogen during hydroprocessing, where the process includes providing a pressure increasing device to a hydroprocessing unit, wherein the pressure increasing device utilizes a high pressure stream from a separator for increasing pressure; introducing a hydrogen containing stream to the pressure increasing device, thereby increasing the pressure of the hydrogen containing stream; and routing the hydrogen containing stream from the pressure increasing device to a vapor-liquid separator. The process also includes separating the hydrogen from the hydrogen containing stream in a hydrogen purification unit to produce a recovered hydrogen stream; and then preferably using the recovered hydrogen stream from the hydrogen purification unit within the hydroprocessing unit.

20 Claims, 14 Drawing Sheets

(56) References Cited

U.S. PATENT DOCUMENTS

| | | |
|---|---|---|
| 2011/0163010 A1 | 7/2011 | Lee et al. |
| 2012/0184789 A1 | 7/2012 | Ackerson et al. |
| 2012/0294773 A1 | 11/2012 | Wieber et al. |
| 2013/0101475 A1 | 4/2013 | Zimmerman et al. |
| 2013/0112595 A1 | 5/2013 | Al-Abdulal et al. |
| 2013/0112596 A1 | 5/2013 | Ramaseshan et al. |

OTHER PUBLICATIONS

"Case Study 2: Off-Gas Compressor for hydrogen recovery unit at Shell Refinery, Sweden," www.hijet.com/?mode=off_gas_shell&xy=42, retrieved from the internet Jul. 31, 2012, p. 9 1-3.

"Steam balance optimisation strategies," www.mavainsa.com, Nov. 2002, pp. 1-10.

Forbes Marshall Canada Inc., "Thermocompressor Systems Boost Steam to Boost Profits," brochure, pp. 1-4.

\* cited by examiner

ENHANCED HYDROGEN RECOVERY

FIELD OF THE INVENTION

This invention relates to processes for recovering and recycling hydrogen within a processing unit, such as within a hydroprocessing unit. More particularly, certain embodiments of the invention relate to processes for recovering and recycling hydrogen by routing a hydrogen containing stream back into the processing unit via a pressure increasing device, such as a thermocompressor or an ejector type device such as a liquid jet ejector.

BACKGROUND OF THE INVENTION

Hydrogen is an expensive commodity. The efficient use of hydrogen is very important to the economics of a hydroprocessing unit. In current designs of hydroprocessing units, there is a significant amount of hydrogen that is currently not being recovered, such as the hydrogen that ends up in the low pressure fractionation section of either a hydrotreating or hydrocracking unit. The present inventors have realized that if this hydrogen could be economically recovered and recycled to the makeup gas header, then it will reduce the amount of makeup hydrogen that would be required, thus reducing the operating cost associated with producing the hydrogen.

SUMMARY OF THE INVENTION

Thermocompressors provide a certain utility to process design in that they combine two or more streams to elevate the pressure of at least one stream. Thermocompressors can be used in steam system applications, where high pressure steam may be combined with low pressure steam to yield medium pressure steam with a higher utility. The present invention provides several applications for thermocompressors to solve design shortcomings not heretofore recognized.

For example, a typical hydroprocessing unit looses hydrogen to fuel gas through solubility losses. Solubility hydrogen losses arise because liquid products from the reaction section are held at pressures high enough that hydrogen is dissolved and carried into the fractionation section. Once in the fractionation section at lower pressure, this hydrogen evolves out of one of the fractionation vapor overhead systems (such as the stripper overhead) where it is then routed to an end use, typically as fuel gas.

The present inventors have realized that if this hydrogen could instead be recovered for purification, such as in a Pressure Swing Adsorption Unit (PSA) or other hydrogen purification unit, then significant additional value could be realized. For example, assuming a representative value of recycling hydrogen to be about $900 per metric ton (marginal value of recovering hydrogen vs. burning it as fuel gas), and further assuming that a hydroprocessing unit has solubility losses on the order of 2,000 tons of hydrogen per year, if recovery of this hydrogen were feasible, approximately $2 million (USD) could be saved per year.

PSA units typically require their feed stream(s) to have a pressure of about 400 psig. A typical hydroprocessing stripper overhead operates at around 100 psig. Thus, to recover the hydrogen from solubility losses, the present inventors have identified the problem to be how to elevate the hydrogen pressure (which, in this example, involves elevating the pressure from 100 psig to 400 psig). The current inventors realize that one solution to this problem is to install a reciprocating compressor. However, the disadvantage of using a reciprocating compressor in this manner is that is not economically lucrative.

Thus, there is a need for an economically efficient way to recover hydrogen from a processing unit.

In order to overcome the problems mentioned above, the present inventors have found that the required pressure increase can be accomplished either via a liquid jet ejector, or via thermocompression in one or more stages with a high-pressure motive stream.

The present inventors also realized that application of thermocompressors to such a system may also eliminate the need for equipment to process the low-pressure off-gas that would normally be produced. If the off-gas stream is combined with another stream, then the unit design is reduced to processing the single stream and the amount of equipment required is decreased.

The present inventors also realize that there are similar hydrogen solubility losses and therefore the potential for recovery also exists in other processing units, such as Catalytic Reforming Unit Debutanizers, Fluid Catalytic Cracking Unit (FCC) Main Columns, Hydrogen Once-Through (HOT) units, Butane Isomerization, Pentane Isomerization, etc. In theory, the same principles may be applied to any system with hydrogen or other light gases desirable for recovery.

In certain embodiments, the present invention specifically considers the application of thermocompressors to hydrogen recovery from a traditional hydroprocessing stripper overhead. Of course, other applications are also considered as being within the scope of the invention.

More specifically, one aspect of the present invention relates to a process for recovering hydrogen during hydroprocessing, where the process includes providing a pressure increasing device to a hydroprocessing unit, wherein the pressure increasing device utilizes a high pressure stream from another component (such as a separator or a scrubber) for increasing pressure; introducing a hydrogen containing stream to the pressure increasing device, thereby increasing the pressure of the hydrogen containing stream; and routing the hydrogen containing stream from the pressure increasing device to a vapor-liquid separator. The process related to this aspect also includes separating the hydrogen from the hydrogen containing stream in a hydrogen purification unit to produce a recovered hydrogen stream; and using the recovered hydrogen stream from the hydrogen purification unit within the hydroprocessing unit.

Another aspect of the present invention relates to a process for recovering hydrogen during hydroprocessing, where the process includes providing a thermocompressor to a hydroprocessing unit, wherein the thermocompressor utilizes a high pressure liquid stream from a separator for increasing pressure; introducing an off-gas stream containing hydrogen from a stripper receiver to the thermocompressor, thereby increasing the pressure of the hydrogen containing stream; and amine treating the hydrogen containing stream from the thermocompressor in an amine scrubber. The process related to this aspect also includes routing the hydrogen containing stream from the amine scrubber to a pressure swing adsorption unit to produce a recovered hydrogen stream; and using the recovered hydrogen stream from the pressure swing adsorption unit within the hydroprocessing unit.

An additional aspect of the present invention relates to a process for recovering hydrogen during hydroprocessing, where the process includes providing a thermocompressor to a hydroprocessing unit, wherein the thermocompressor utilizes a high pressure liquid stream from a pump for increasing pressure; introducing an off-gas stream containing hydrogen from a stripper receiver to the thermocompressor, thereby increasing the pressure of the hydrogen containing stream; and routing the hydrogen containing stream from the thermocompressor to a vapor-liquid separator. The process related to this aspect also includes amine gas treating the hydrogen containing stream from the vapor-liquid separator in an amine scrubber; routing the hydrogen containing stream from the amine scrubber to a pressure swing adsorption unit to produce a recovered hydrogen stream; and using the recovered hydrogen stream from the pressure swing adsorption unit within the hydroprocessing unit.

DETAILED DESCRIPTION OF THE INVENTION

Various embodiment of the present invention will be described while referring to FIGS. 1-14. Of course, other embodiments, as well as variations and combinations of the described and illustrated embodiments, are also envisioned.

Figure 1:
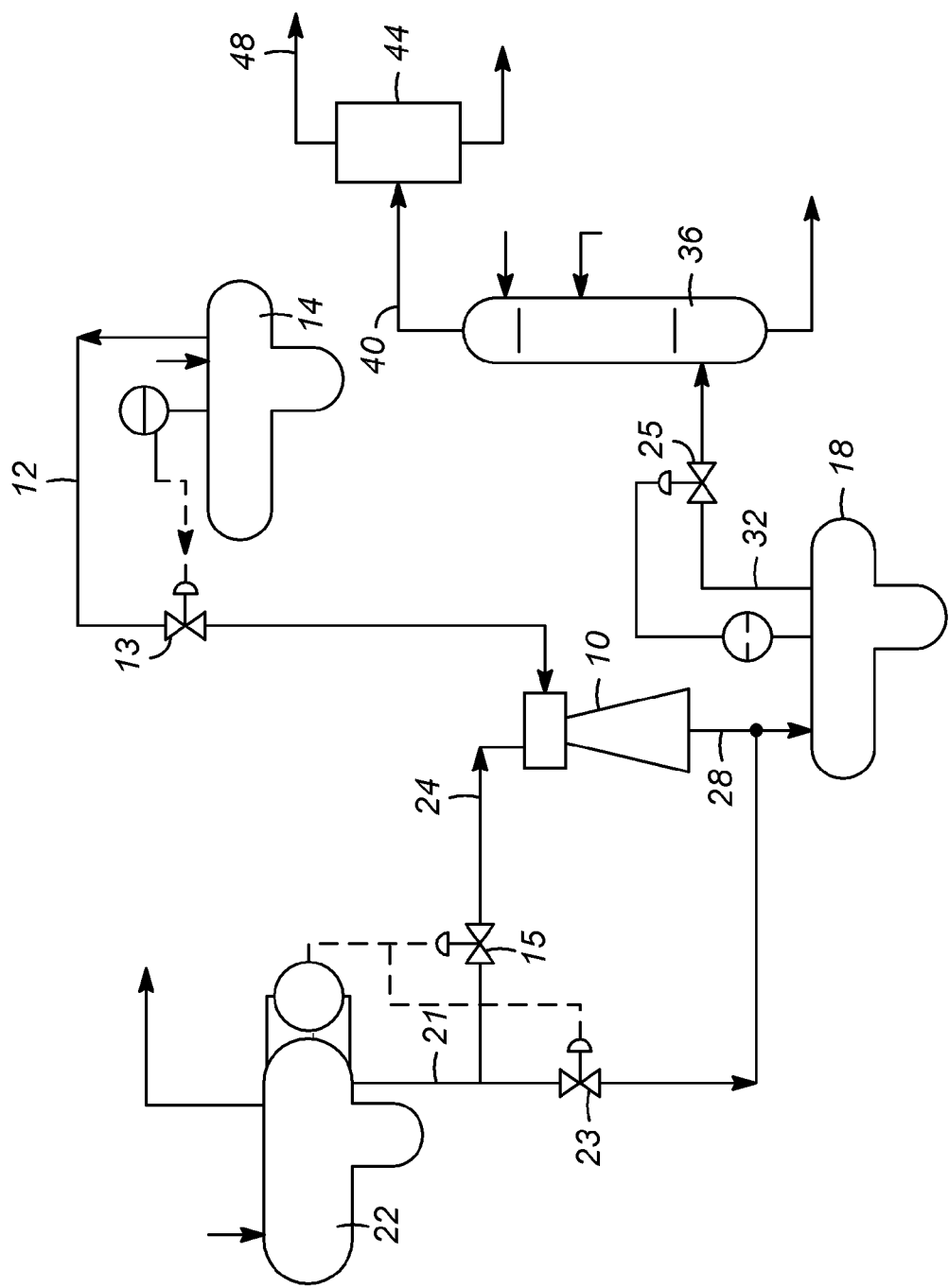
FIG. 1 is an illustration of an embodiment of the present process shown using an ejector type device.

Turning now to FIG. 1, a first embodiment of the present process will be described. FIG. 1 shows an example of how the present process can be incorporated into a hydroprocessing unit, such as a hydrotreating unit or a hydrocracking unit. As such hydroprocessing units are well known in the art, the process flows and components of such units will not be described herein, and only the portion and components of the present process relating to recovering hydrogen will be described in detail.

In the FIG. 1 embodiment, a pressure increasing device 10, such as a high compression ratio liquid jet ejector (one example of which is manufactured by Hijet International, Inc., and is sold under the Hijector trademark) is provided to compress a hydrogen containing stream, such as the off gas 12 from a stripper receiver 14, to the desired pressure so that it can be routed to a vapor-liquid separator, such as a cold flash drum 18. Of course, depending on the application, it is contemplated that the pressure increasing device 10 could instead be another ejector type device or a thermocompressor.

In the FIG. 1 embodiment, the hydrogen containing stream 12 is approximately 60 mole percent (mol %) hydrogen, and the hydrogen containing streams for other applications/embodiments are expected to contain other percentages of hydrogen such as between approximately 25 mol % and approximately 75 mol % or between the narrower range of approximately 55 mol % and approximately 65 mol %.

Additionally, although in the FIG. 1 embodiment the hydrogen containing stream 12 is described as being off gas from the stripper receiver, other sources of such a low-pressure hydrogen-rich stream are also contemplated for this embodiment, as well as for the other embodiments. For example, this stream could be obtained from equipment downstream of the stripper receiver, from overhead vapor of a debutanizer or a main fractionator, or it could be any low-pressure hydrogen-rich stream from another processing unit. Preferably, the line containing the hydrogen containing stream 12 includes a control valve 13 between the stripper receiver 14 and the pressure increasing device 10 to monitor and adjust the flow rate as necessary.

Returning to FIG. 1, a separator, such as cold separator 22, is shown as providing a high pressure stream 24 to the pressure increasing device 10, and this high pressure stream 24 is used for increasing the pressure of the hydrogen containing stream 12 received from the stripper receiver 14. The line carrying the high pressure stream 24 includes a control valve 15 between the cold separator 22 and the pressure increasing device 10 to monitor and adjust the flow rate as necessary. Additionally, cold separator liquid 21 from the cold separator 22 in excess of that required to compress the combined gas is let down over a separate control valve 23 in parallel. In this specific example, the high pressure stream 24 from the cold separator 22 has a pressure of approximately 160 Barg and the hydrogen containing stream 12 has a pressure of approximately 10 Barg. However, pressures of the high pressure stream for other applications/embodiments are expected to be between approximately 100 Barg and approximately 160 Barg, and pressures of the hydrogen containing stream for other applications/embodiments are expected to be between approximately 5 Barg and approximately 15 Barg, but other pressures are also contemplated. Further, in this example, the high pressure stream 24 is a liquid stream. However, the high pressure stream could instead be a vapor stream, or a mix of liquid and vapor, in any of the embodiments.

After the pressure increasing device 10 increases the pressure of the hydrogen containing stream 12 by utilizing the energy provided by the high pressure stream 24, the resultant stream 28, which is at a moderate pressure (i.e., between that of high pressure stream 24 and stream 12), is routed to the cold flash drum 18, in this embodiment (or to another vapor liquid separator, in other embodiments). In the FIG. 1 embodiment with the exemplary pressures and other parameters provided above, the pressure of stream 28 is approximately 28 Barg. However, in other applications/embodiments, stream 28 is expected to be between approximately 25 Barg and approximately 30 Barg, but other pressure ranges are also contemplated.

If hydrogen sulfide ($H_2S$) is present in the vapor stream 32 exiting the cold flash drum 18, this stream is routed to an amine scrubber 36 (or other amine treatment unit), where it is amine treated in any conventional manner. The line containing the vapor stream 32 utilizes a control valve 25 between the cold flash drum 18 and the amine scrubber 36 so as to monitor and adjust the flow rate as necessary. After the amine treatment step, which may be skipped if un-necessary, the hydrogen containing stream 40 is routed to a hydrogen purification unit, such as a pressure swing adsorption (PSA) unit 44, for producing a recovered hydrogen stream 48. In the FIG. 1 embodiment with the exemplary pressures and other parameters provided above, the pressure of the recovered hydrogen stream 48 is approximately 26 Barg. However, in other applications/embodiments, stream 48 is expected to be between approximately 23 Barg and approximately 28 Barg, but other pressure ranges are also contemplated. Further, although a PSA unit is used in this embodiment, other methods of hydrogen purification are also contemplated, such as using a membrane unit.

The recovered hydrogen stream 48 can then be routed back into the hydroprocessing unit, such as to the make-up gas header, thereby reducing the amount of makeup hydrogen that would otherwise have been required. The recycle of hydrogen containing stream 12 received from the stripper receiver 14 also eliminates the need for other low-pressure equipment to process stream 12.

Another benefit of the present process is improved LPG and light naphtha recovery. The following computer simulations were performed to show such improvements. First, a computer simulation of a hydrocracking unit was designed with all of the vessels necessary to practice the embodiment detailed in FIG. 1, but lacking a pressure increasing device (such as thermocompressor 10) and the other associated equipment. This unit was also designed with an amine off-gas scrubber and sponge absorber to further process the stripper off-gas before routing it to a fuel gas header. The amine off-gas scrubber and sponge absorber serve to remove $H_2S$, and to recover additional LPG & light naphtha, from the stripper off-gas, respectively. In this first design example, the present process as detailed in the embodiment of FIG. 1 may be applied with the off-gas taken from a point down-stream of the sponge absorber. For the purposes of this first example, this off-gas has approximately the composition as shown in Table 1 below.

TABLE 1

| Water | 1.5% |
|---|---|
| Hydrogen | 4.8% |
| C1 & C2 | 72.6% |
| C3 & C4 | 10.4% |
| C5 & C6 | 4.4% |
| C7+ | 6.1% |

Off-Gas Flow: 6,200 lbs/hr

TABLE 2

| Water | 0.7% |
|---|---|
| Hydrogen | 14% |
| C1 & C2 | 80.3% |
| C3 & C4 | 5% |
| C5 & C6 | 0.0% |
| C7+ | 0.0% |

Recovered Gas to PSA: 2,200 lbs/hr

TABLE 3

| Water | 0% |
|---|---|
| Hydrogen | 0% |
| C1 & C2 | 70% |
| C3 & C4 | 15% |
| C5 & C6 | 7% |
| C7+ | 8% |

Recovered Liquid to Stripper: 3,500 lbs/hr

A computer simulation of this first example was then run after applying the present process. Tables 2 and 3 above show the marginal increase in recovery, where Table 2 shows the breakdowns for a 2,200 lb/hour increase in gas going to the PSA unit and Table 3 shows the breakdowns for a 3,500 lb/hour increase in the liquid going to the stripper. When the present process is applied, and the off-gas is recovered via the pressure increasing device (such as thermocompressor 10), essentially all of the hydrogen in the off-gas stream is recovered in vapor stream 40 that is routed to the PSA 44 for hydrogen recovery; greater than 80% of the C3 & C4 (LPG) and greater than 90% of the C5, C6, & C7+ (light naphtha) are recovered in the liquid stream (not shown) from the cold flash drum 18. It should be noted that the non-hydrogen components are removed in the PSA unit. With regard to Table 3, it should be also be noted that the C2 and lighter compounds are preferably routed back to the off gas and thus can be removed in the PSA unit.

A second computer simulation of a second hydrocracking unit was designed with all of the vessels necessary to practice the embodiment detailed in FIG. 1, but again lacking the pressure increasing device and other associated equipment. For the purposes of this second example, the stripper off-gas in this case has approximately the composition as shown in Table 4 below.

TABLE 4

| Water | 1% |
|---|---|
| Hydrogen | 1% |
| $H_2S$ | 5% |
| C1 & C2 | 12% |
| C3 & C4 | 59% |
| C5 & C6 | 22% |
| C7+ | 1% |

Off-Gas Flow: 50,000 lbs/hr

TABLE 5

| Water | 0% |
|---|---|
| Hydrogen | 5% |
| $H_2S$ | 0% |
| C1 & C2 | 39% |
| C3 & C4 | 46% |
| C5 & C6 | 9% |
| C7+ | 1% |

Recovered Gas to PSA: 5,700 lbs/hr

TABLE 6

| Water | 0% |
|---|---|
| Hydrogen | 0% |
| $H_2S$ | 4% |
| C1 & C2 | 9% |
| C3 & C4 | 62% |
| C5 & C6 | 24% |
| C7+ | 1% |

Recovered Liquid to Stripper: 43,000 lbs/hr

A computer simulation of this second example was then run after applying the present process. Tables 5 and 6 above show the marginal increase in recovery, where Table 5 shows the breakdowns for a 5,700 lb/hour increase in gas going to the PSA unit and Table 6 shows the breakdowns for a 43,000 lb/hour increase in the liquid going to the stripper. When the present process is applied to this second example, and the off-gas is recovered via the pressure increasing device (such as thermocompressor 10), greater than 98% of the hydrogen in the stripper off-gas stream is recovered in vapor stream 40 that is routed to the PSA 44 for hydrogen recovery; greater than 90% of the C3 & C4 (LPG) and greater than 95% of the C5, C6, & C7+ (light naphtha) are recovered in the liquid stream (not shown) from the cold flash drum 18. Once again, it should be noted that the non-hydrogen components are removed in the PSA unit. With regard to Table 6, it should also be noted that the C2 and lighter compounds are preferably routed back to the off gas and thus can be removed in the PSA unit.

Next, additional embodiments will be described below. In these embodiments, components similar to those of FIG. 1 embodiment will utilize the same reference numbers. Also, the description of processes and components similar to those of the FIG. 1 embodiment will be omitted. It should be noted that those of ordinary skill in the art will realize that it is possible to combine features of different embodiments into a single system.

Figure 2:
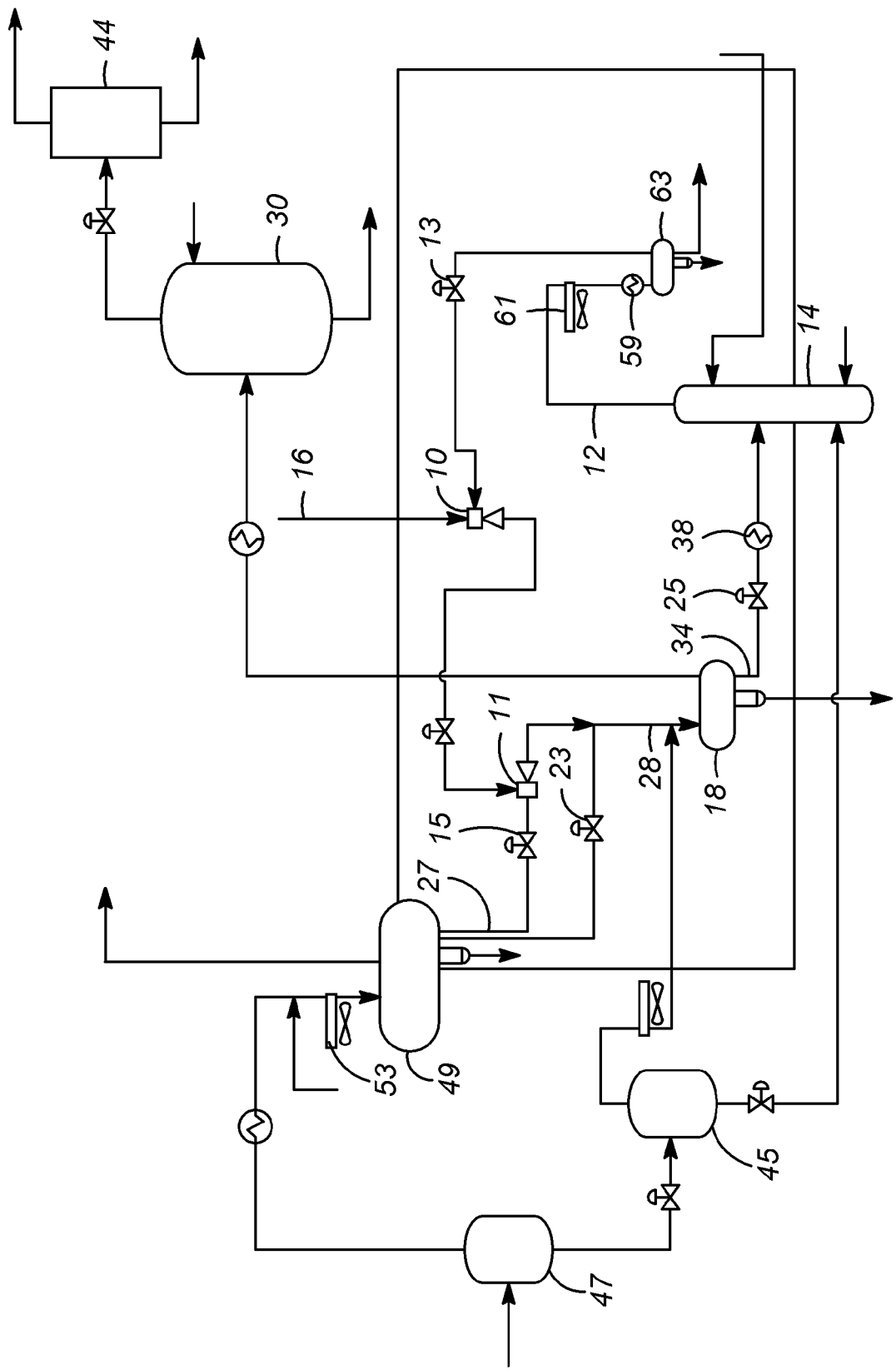
FIG. 2 is an illustration of an embodiment of the present process shown using a thermocompressor.

In the embodiment as shown in FIG. 2, the application of thermocompression to these streams eliminates the need for some low-pressure equipment, including a fuel gas scrubber and sponge absorber in this example. Similar novel applications may be applied to other systems based on their design criteria.

In the embodiment of FIG. 2, the stripper overhead vapor stream 12, which is a hydrogen containing stream, from the stripper receiver 14 first enters the suction of a thermocompressor 10 with a de-ethanizer overhead vapor 16 as its motive force. En route to the thermocompressor 10, the line containing the stripper overhead vapor 12 stream includes a control valve 13 to monitor and adjust parameters as necessary, as well as heat exchanger 59, a cooling device 61, and a pressure vessel 63. The stripper overhead vapor 12 and the de-ethanizer overhead vapor 16 are at pressures of approximately 100 psig and 250 psig, respectively.

The de-ethanizer overhead vapor stream 16 and the stripper overhead vapor stream 12 routed to the thermocompressor 10 enter the suction of an additional thermocompressor 11 with the cold separator liquid 27 as its motive force. Motive force flow through the thermocompressor 11 would be monitored by a control valve 15 such that a discharge pressure of approximately 400 psig is attained, with an intermediate pressure of approximately 150 psig, depending on the relative rates of the stripper and de-ethanizer overhead vapors. Cold separator liquid 27 in excess of that required to compress the combined gas stream is let down over a separate control valve 23 in parallel.

The resultant stream 28 from the second thermocompressor 11 is routed to a cold flash drum 18. The vast majority of the of the resultant stream from the cold flash drum 18 will pass overhead and will be routed to an off-gas scrubber 30 to remove $H_2S$ and then will be routed to a PSA 44, or a similar device, for hydrogen recovery. However, some of the combined gas stream 28 resulting from the combination of the stripper overhead vapor 12 and de-ethanizer overhead vapor 16, particularly the heavy components, may re-dissolve and be recycled back to the stripper receiver 14. This recycle stream 34 should be small because gas solubility in the cold flash drum 18 will be mostly limited by temperature and pressure. In addition, the recycle stream 34 passes through a heat exchanger 38 and a control valve 25 between the cold flash drum 18 and the stripper receiver 14 to monitor and adjust the recycle stream 34 as necessary. This recycling step of recovering the stripper overhead vapor 12 will decrease the relative volatility of LPG in the cold flash drum 18 and will result in higher LPG and light naphtha recovery. This embodiment also includes a hot flash drum 45, a hot high pressure separator 47, a cold high pressure separator and a cooling device 53, as well as other components, as depicted in the figure, and these components operate in their customary manner.

Figure 3A:
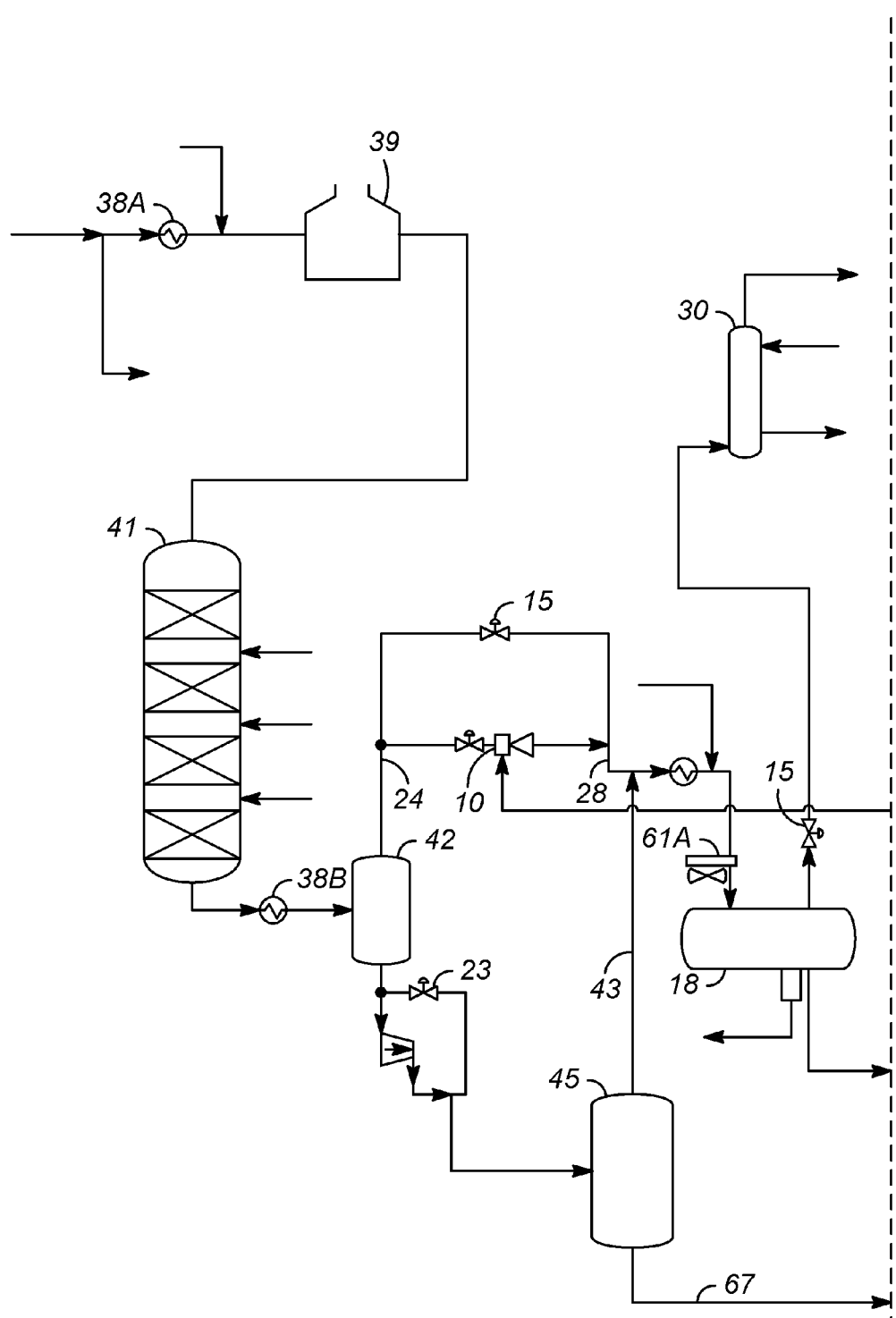
FIG. 3 (which is divided into FIGS. 3A and 3B) is an illustration of a second embodiment of the present process shown using a thermocompressor
Figure 3B:
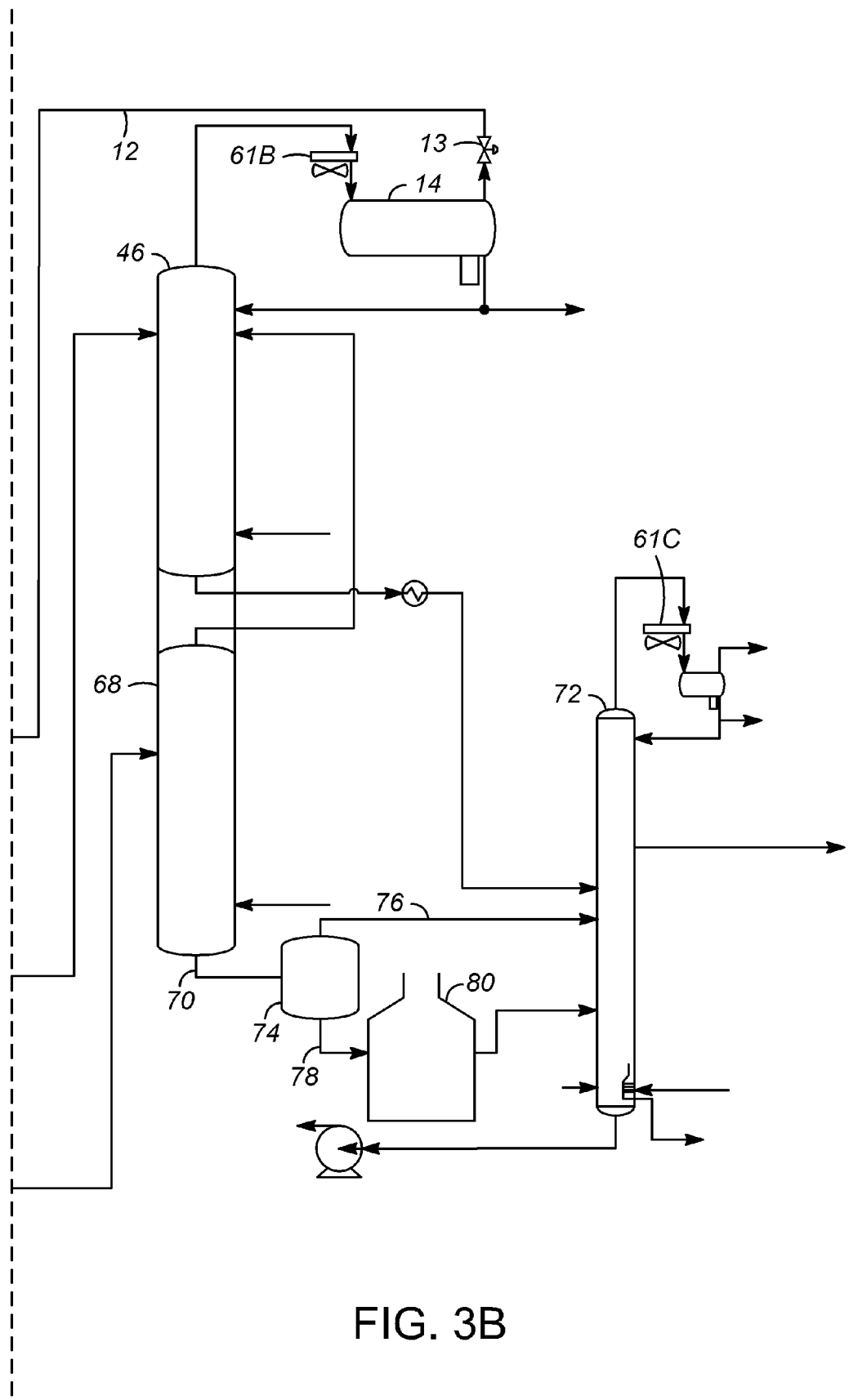

Another embodiment is shown in FIGS. 3A and 3B, this "Hydrogen Once-Through (HOT) hydroprocessing" system incorporates a thermocompressor to enable hydrogen recovery from the stripper off-gas and eliminates a need for separate low-pressure vessels to produce this off-gas.

In the FIG. 3A/3B embodiment, the hydrogen containing stripper off-gas stream 12 is routed from the stripper receiver 14 to a thermocompressor 10. En route to the thermocompressor 10, the line carrying the stripper off-gas stream 12 incorporates a control valve 13 to monitor and adjust stream parameters as necessary. The stripper off-gas stream 12 is met at the thermocompressor 10 with a high pressure stream 24 routed from a hot separator 42. Prior to reaching the hot separator 42, the stream passes through various components, such as heat exchangers 38A and 38B, heater 39, and column 41, as shown in FIG. 3A/3B.

A control valve 15 is incorporated into the line carrying the high pressure stream 24 between the hot separator 42 and the thermocompressor 10 to adjust stream parameters as necessary. Additionally, vapor from the high pressure stream 24 in excess of that required to compress the combined gas at the thermocompressor 10 is let down over a separate control valve 23 in parallel.

The resultant stream 28 from the thermocompressor 10 is combined with a vapor stream 43 containing leftover hydrogen from a hot flash drum 45. The combined stream of the vapor stream 43 and stream 28 is then fed to a cold flash drum 18. The vast majority of the resultant stream from the cold flash drum 18 will pass overhead and will be routed to an off-gas scrubber 30 to remove $H_2S$ and will then be routed to a PSA, or a similar device, for hydrogen recovery. However, some of the combined stream, particularly the heavy components, may re-dissolve and be subsequently routed to a cold flash stripper 46. One of the resultant streams from the cold flash stripper 46 is recycled back to the stripper receiver 14. Finally, in between the cold flash drum 18 and the off-gas scrubber 30 is a control valve 15 to monitor the parameters of the stream.

The liquid stream 67 from the hot flash drum 45 is routed to a hot flash stripper 68. The lower resultant stream 70 exiting the hot flash stripper 68 is passed to product fractionator 72, after passing through such components as pre flash drum 74, which separates the stream into a stream 76, that is routed directly to the product fractionators 72, and stream 78, which passes through a heater 80, before being routed to fractionator 72, which separates the various products, as known in the art. The FIG. 3 may also include various cooling devices, such as devices 61A, 61B and 61C, and heat exchangers, as deemed necessary.

Figure 4:
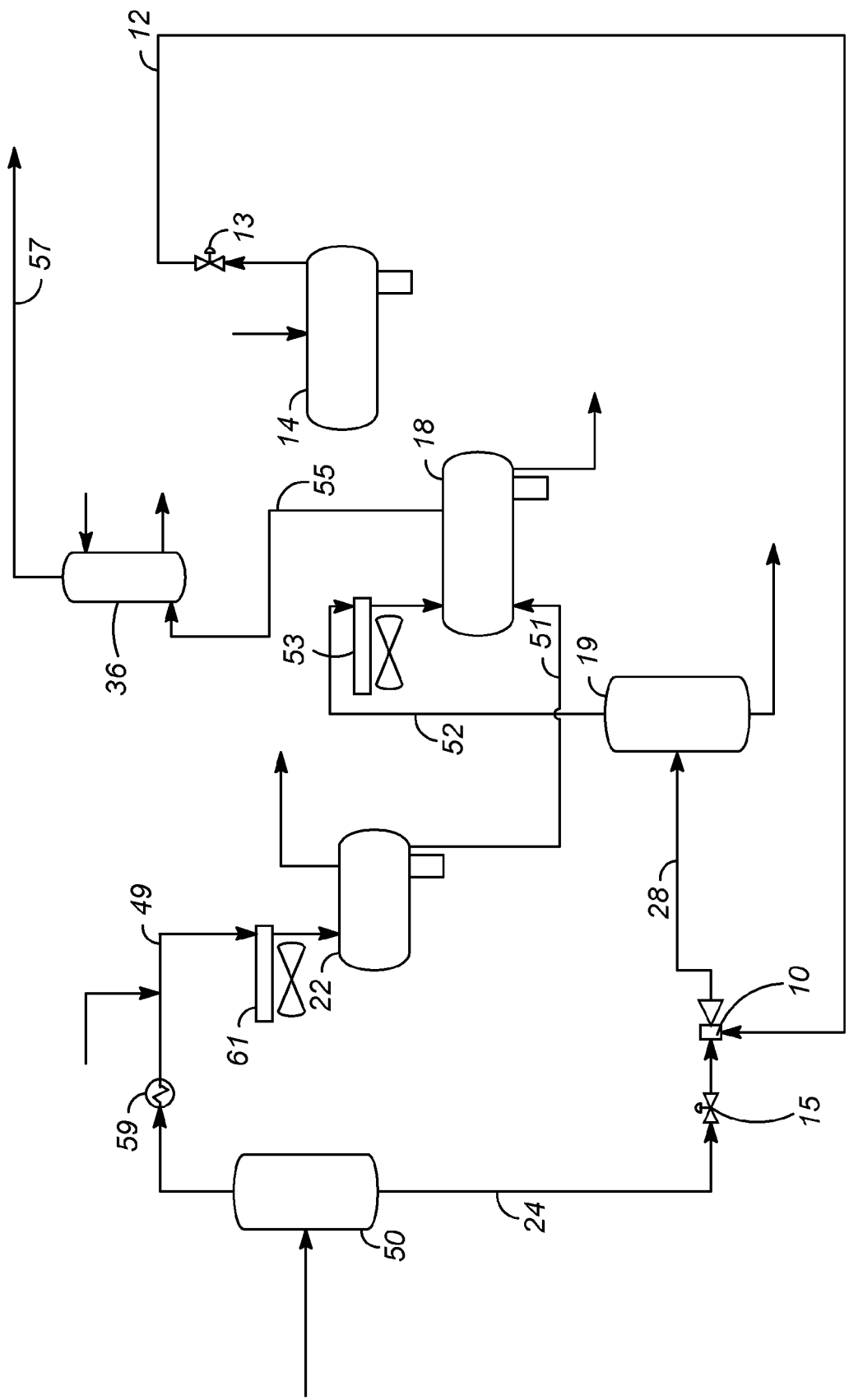
FIG. 4 is an illustration of a third embodiment of the present process shown using a thermocompressor.

Another embodiment is shown in FIG. 4, and in this embodiment the stripper overhead vapor 12 (which contains hydrogen) from the stripper receiver 14 first enters the suction of a thermocompressor 10 with a high pressure stream 24 as its motive force. In between the stripper receiver 14 and the thermocompressor 10, the line that carries the stripper overhead vapor 12 stream incorporates a control valve 13 to monitor and adjust parameters as necessary. The stripper off-gas stream 12 and the high pressure stream 24 are at pressure of approximately 150 psig and 2000 psig, respectively.

The stripper off-gas stream 12 and the high pressure stream 24 are routed to the thermocompressor 10. The high pressure stream 24, which in this embodiment results from the hot separator 50, is rated through a control valve 15 before the stream is fed to the thermocompressor 10 so as to monitor and adjust the parameters of the high pressure stream 24 as necessary. The resultant stream 28 from the thermocompressor 10 is routed to a hot flash drum 19. The hydrogen rich resultant stream 52 from the hot flash drum 19 is routed to a cold flash drum 18, after passing through cooling device 53. The cold flash drum 18 also receives a stream 51 from a cold separator 22. Prior to the cold separator 22, the stream 49 has passed from the hot separator 50, to a heat exchanger 59 and then through a cooling device 61.

The majority of the resultant stream 55 will pass overhead from the cold flash drum 18 to the amine scrubber 36. Once the amine scrubber has removed $H_2S$, the hydrogen rich resultant stream 57 is routed from the amine scrubber to a PSA or similar device, for hydrogen recovery.

Figure 5:
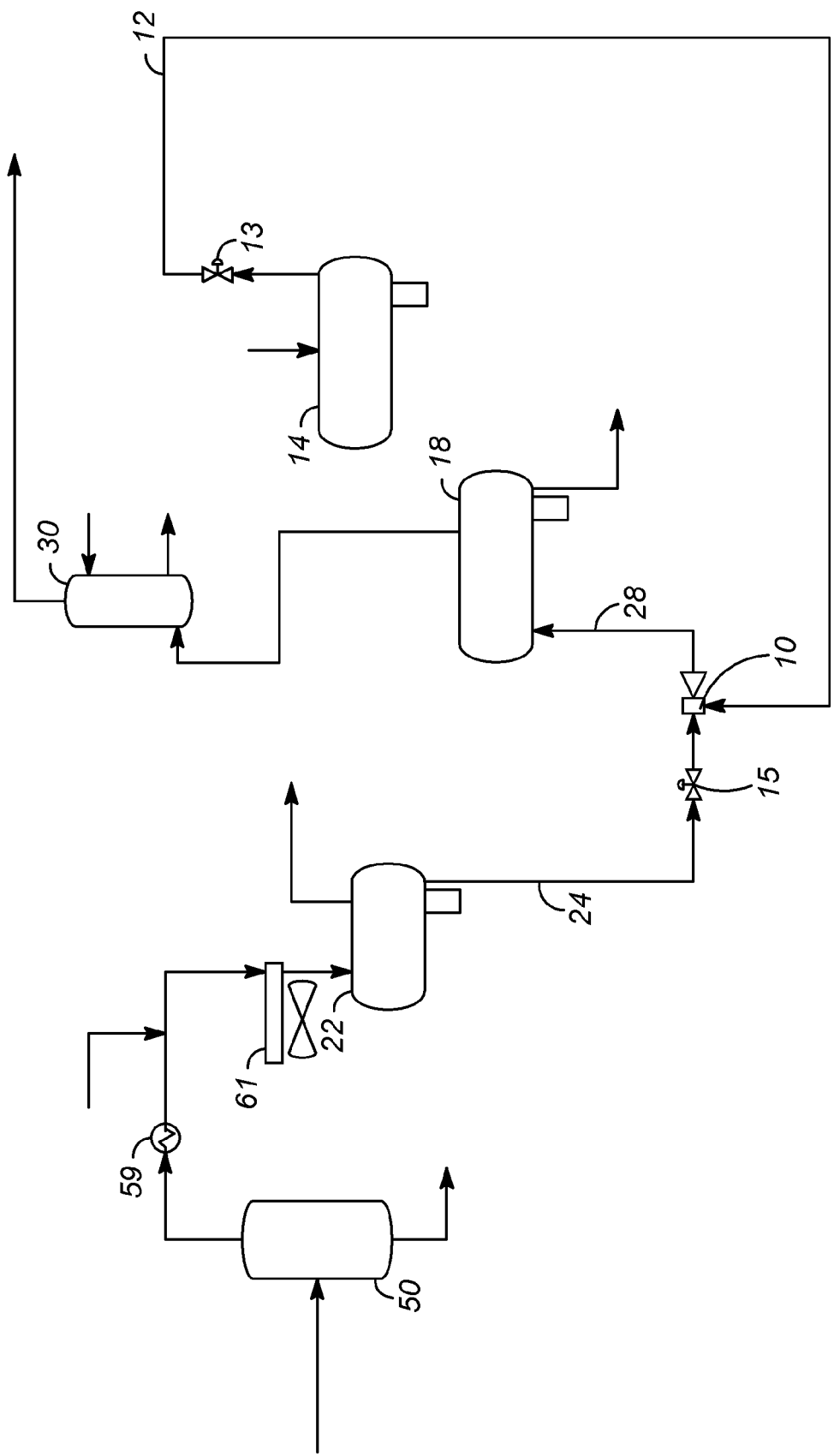
FIG. 5 is an illustration of a fourth embodiment of the present process shown using a thermocompressor.

Another embodiment is shown in FIG. 5, and in this embodiment the stripper overhead vapor 12 (which contains hydrogen) from the stripper receiver 14 is routed in combination with a high pressure stream 24 resulting from a cold separator 22 to a thermocompressor 10. A control valve 13 is incorporated into the line that carries the stripper overhead vapor 12 stream before the thermocompressor 10 but after the stripper receiver 14. In addition, in between the cold separator 22 and the thermocompressor 10, a control valve 15 has been incorporated into the line carrying the high pressure stream 24. Both control valves 13 and 15 are used to monitor and adjust the parameters of their respective streams as necessary. Prior to the cold separator 22, this embodiment also includes the hot separator 50, the heat exchanger 59, and the cooling device 61, as in the FIG. 4 embodiment.

As can be seen in FIG. 5, the resultant stream 28 from the thermocompressor 10 is routed to a cold flash drum 18. The vast majority of the of the resultant stream from the cold flash drum 18 will pass overhead and will be routed to an off-gas scrubber 30 to remove $H_2S$ and will then be routed to a PSA or a similar device, for hydrogen recovery. The heavier components remaining in the cold flash drum 18 will be routed to a fractionation section for further processing.

Figure 6:
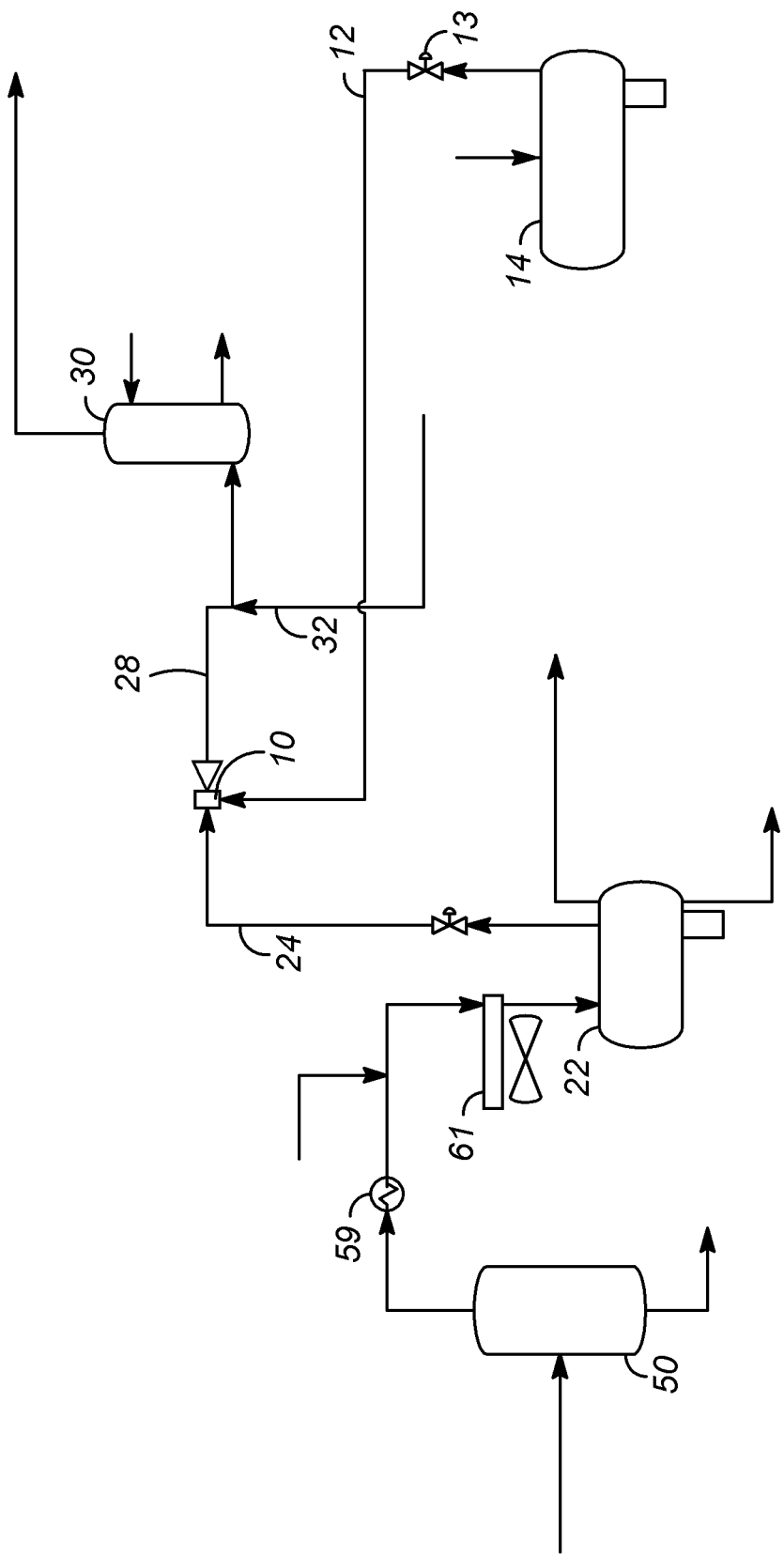
FIG. 6 is an illustration of a fifth embodiment of the present process shown using a thermocompressor.

Another embodiment is shown in FIG. 6 and in this embodiment, the hydrogen containing stripper overhead vapor stream 12 from the stripper receiver 14 is routed in combination with a high pressure stream 24 resulting from a cold separator 22 to a thermocompressor 10. A control valve 13 is incorporated into the line that carries the stripper overhead vapor 12 stream before the thermocompressor 10 but after the stripper receiver 14. In addition, the line carrying the high pressure stream 24 includes a control valve 15 between the cold separator 22 and the thermocompressor 10 so as to monitor and adjust parameters of the stream as necessary. In this embodiment, the high pressure stream 24 resulting from a cold separator 22 is a recycle gas purge, used to maintain the hydrogen purity of a hydroprocessing unit's recycle gas. The stripper overhead vapor 12 and the high pressure stream 24 are at pressures of approximately 150 psig and 2000 psig, respectively.

The resultant stream 28 leaves the thermocompressor 10 at a pressure of approximately 450 psig and is subsequently combined with a vapor stream 32 resulting from a cold flash drum (not pictured). The combined stream of the resultant stream 28 and the vapor stream 32 is fed to an off-gas scrubber 30 to remove $H_2S$, and then is routed to a PSA (not pictured), or similar device, for hydrogen recovery.

Figure 7:
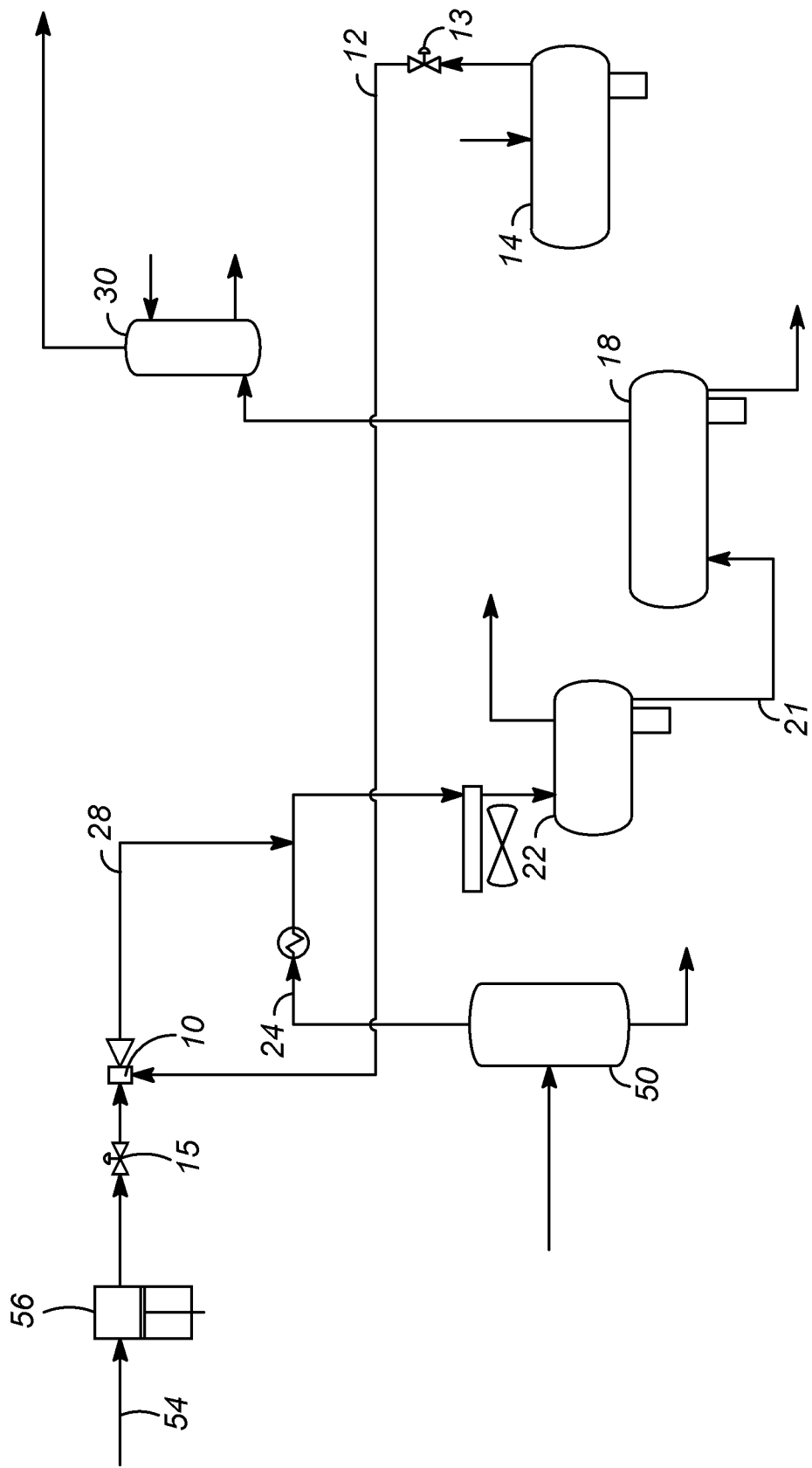
FIG. 7 is an illustration of a sixth embodiment of the present process shown using a thermocompressor.

Turning now to FIG. 7, another embodiment is shown. In this embodiment, the hydrogen containing stripper overhead vapor stream 12 from the stripper receiver 14 is routed to a thermocompressor 10 at a pressure of 150 psig. The stripper overhead vapor 12 is combined with a wash water stream 54 at the thermocompressor 10. The water wash stream 54 is passed through a reciprocating wash water pump 56 before being fed to the thermocompressor 10. A control valve 13 is incorporated into the line that carries the stripper overhead vapor 12 stream at a position before the thermocompressor 10, but after the stripper receiver 14. In addition, the line carrying the wash water stream 54 utilizes a control valve 15 at a position before the thermocompressor, but after the reciprocating wash water pump 56.

The resultant stream 28 leaves the thermocompressor 10 and is routed to a cold separator 22. Before the resultant stream 28 reaches the thermocompressor 10, it is combined with a high pressure vapor stream 24 from hot separator 50, which is fed through a heat exchanger before merging with resultant stream 28. The combined high pressure vapor stream 24 and the resultant stream 28 are routed to a cold separator 22, wherein the majority of the resultant stream from the cold separator will be a cold separator liquid stream 21. The minority of the resultant vapor stream will pass overhead as a recycle gas at a pressure of approximately 2000 psig. The cold separator liquid 21 is routed to a cold flash drum 18. The vast majority of the of the resultant stream from the cold flash drum 18 will pass overhead at a pressure of 450 psig and will be routed to an off-gas scrubber 30 to remove $H_2S$ and will then be routed to a PSA (not pictured), or a similar device, for hydrogen recovery.

Figure 8:
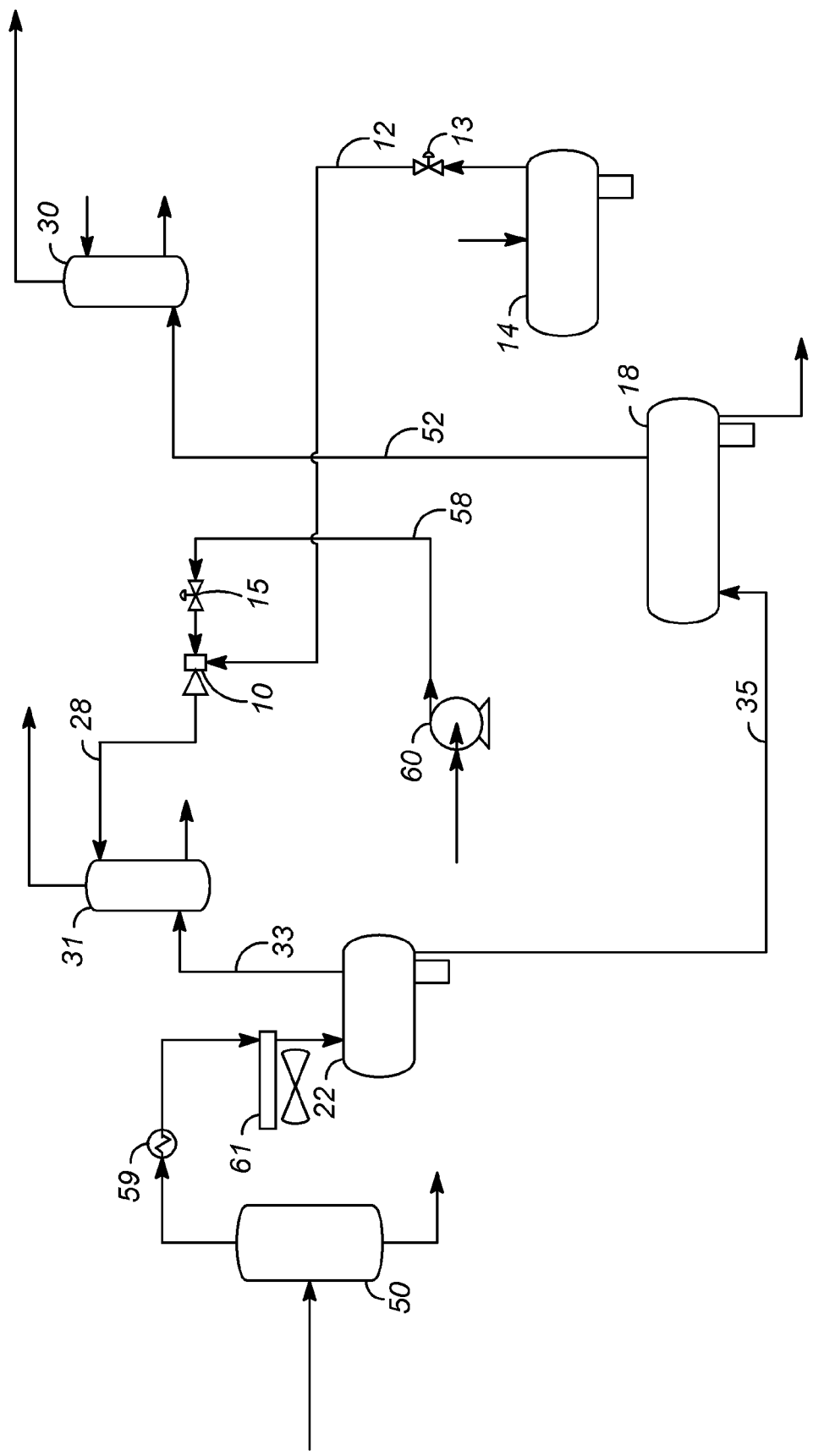
FIG. 8 is an illustration of a seventh embodiment of the present process shown using a thermocompressor.

Another embodiment is shown in FIG. 8. In the FIG. 8 embodiment, the stripper overhead vapor stream 12 (which contains hydrogen) from the stripper receiver 14 is routed to a thermocompressor 10 at a pressure of 150 psig. The stripper overhead vapor stream 12 is combined at the thermocompressor 10 with the lean amine stream 58, which is passed through a high-head centrifugal lean-amine pump 60, or other type of pump, before being routed to the thermocompressor 10. A control valve 13 is incorporated into the line that carries the stripper overhead vapor 12 stream at a location before the thermocompressor 10, but after the stripper receiver 14. In addition, the line for the lean amine stream 58 utilizes a control valve 15 in a location before the thermocompressor 10 but after the high-head centrifugal lean-amine pump 60.

The resultant stream 28 is fed from the thermocompressor 10 to a recycle gas scrubber 31. A minority of the resultant stream 28 fed to the scrubber 31 will pass overhead at a pressure of 2000 psig as clean recycle gas. The scrubber 31 also receives stream 33 from a cold separator 22 (which has previously been passed through a hot separator 50, a heat exchanger 59, and a cooling device 61, as in some of the other embodiments). The lower stream 35 from the cold separator 22 is routed to the cold flash drum 18. The hydrogen rich stream 52 resulting from the cold flash drum 18 will pass overhead at a pressure of 450 psig and will be routed to an off-gas scrubber 30 to remove $H_2S$. The resultant stream from the off-gas scrubber 30 will be fed to a PSA (not pictured), or a similar device, for hydrogen recovery.

Figure 9:
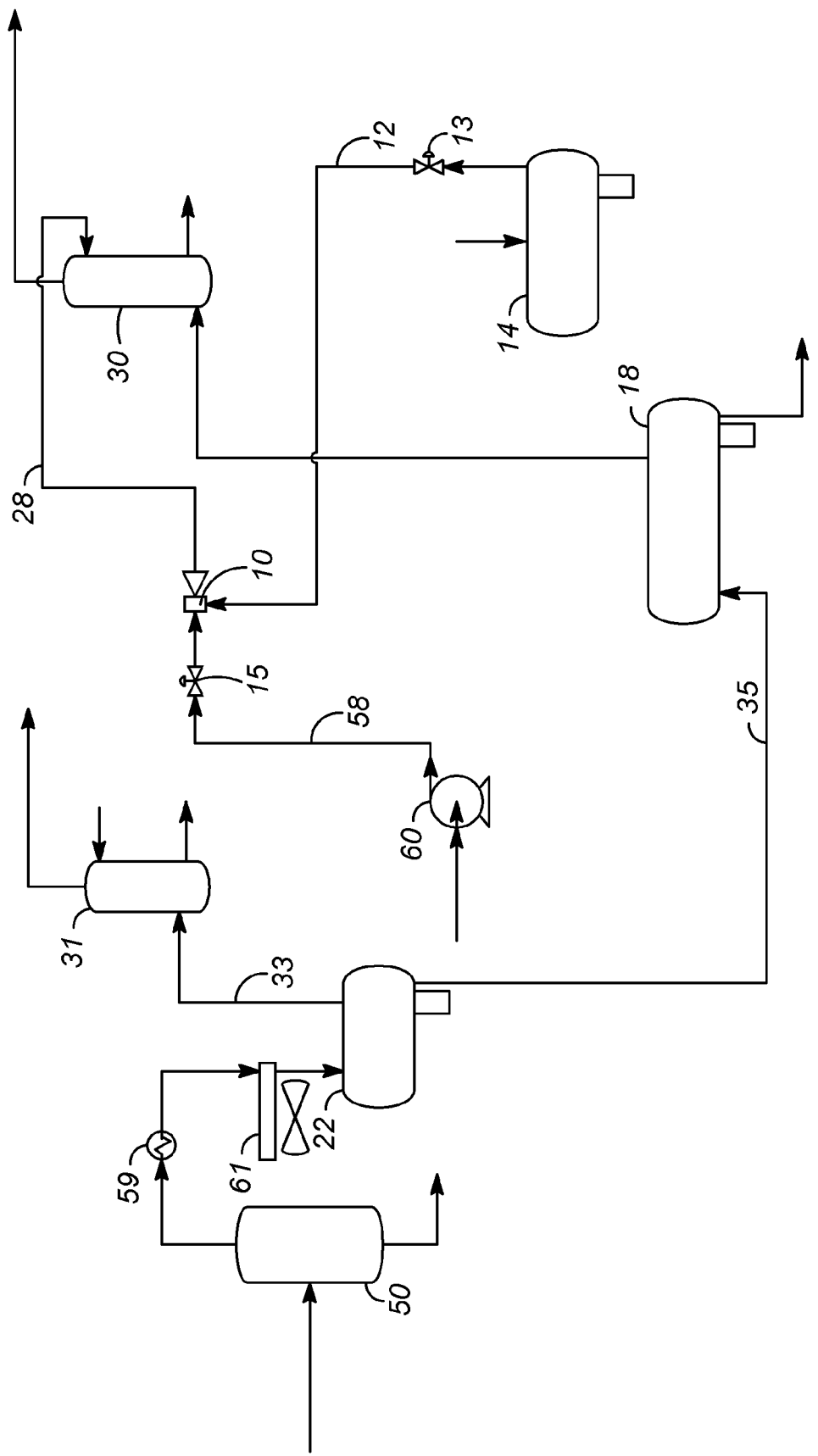
FIG. 9 is an illustration of a eighth embodiment of the present process shown using a thermocompressor.

FIG. 9 depicts yet another embodiment. In the FIG. 9 embodiment, the stripper overhead vapor stream 12 (which contains hydrogen) from the stripper receiver 14 is routed to a thermocompressor 10 at 150 psig. The stripper overhead vapor stream 12 is combined at the thermocompressor 10 with the lean amine stream 58, which is passed through a high-head centrifugal lean-amine pump 60 before being routed to the thermocompressor 10. A control valve 13 is incorporated into the line that carries the stripper overhead vapor 12 stream at a location before the thermocompressor 10, but after the stripper receiver 14. In addition, the line for the lean amine stream 58 utilizes a control valve 15 before the thermocompressor 10, but after the high-head centrifugal lean-amine pump 60. The resultant stream 28 is fed from the thermocompressor 10 to an off-gas scrubber 30 to remove H$_2$S it will then will be routed to a PSA (not pictured), or a similar device, for hydrogen recovery. The FIG. 9 embodiment also includes some of the same components and processes as the FIG. 8 embodiment, such as cold separator 22, recycle gas scrubber 31, etc., which need not be described again as they perform in the same manner.

Figure 10:
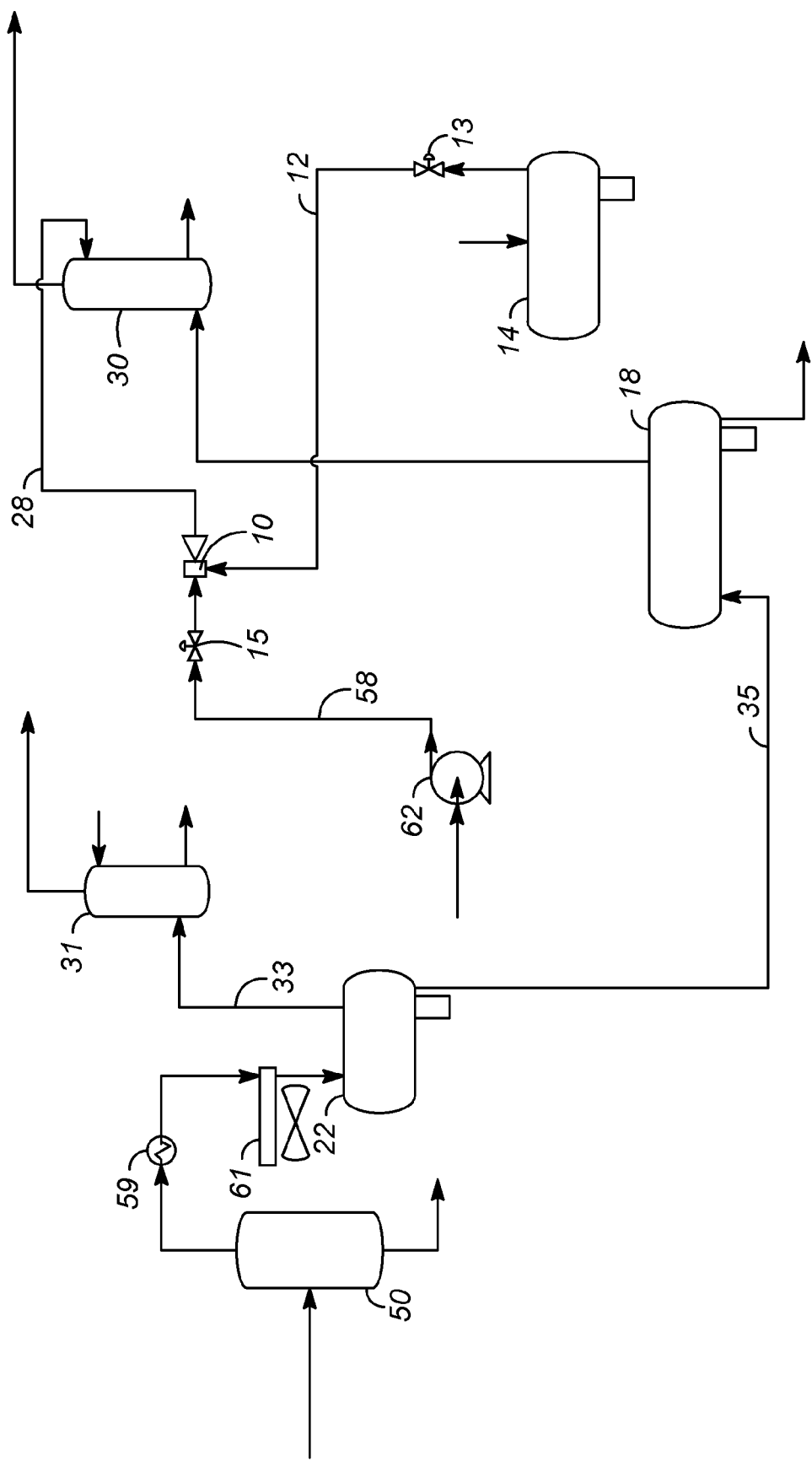
FIG. 10 is an illustration of an ninth embodiment of the present process shown using a thermocompressor.

Another embodiment is shown in FIG. 10. In this embodiment, the hydroprocessing system shown is essentially the same as can be seen in FIG. 10. However, instead of a high-head centrifugal lean amine pump, the FIG. 10 embodiment utilizes an off-gas scrubber lean-amine pump 62. The off-gas scrubber lean-amine pump 62 operates at a lower discharge pressure than a high-head centrifugal pump.

Figure 11:
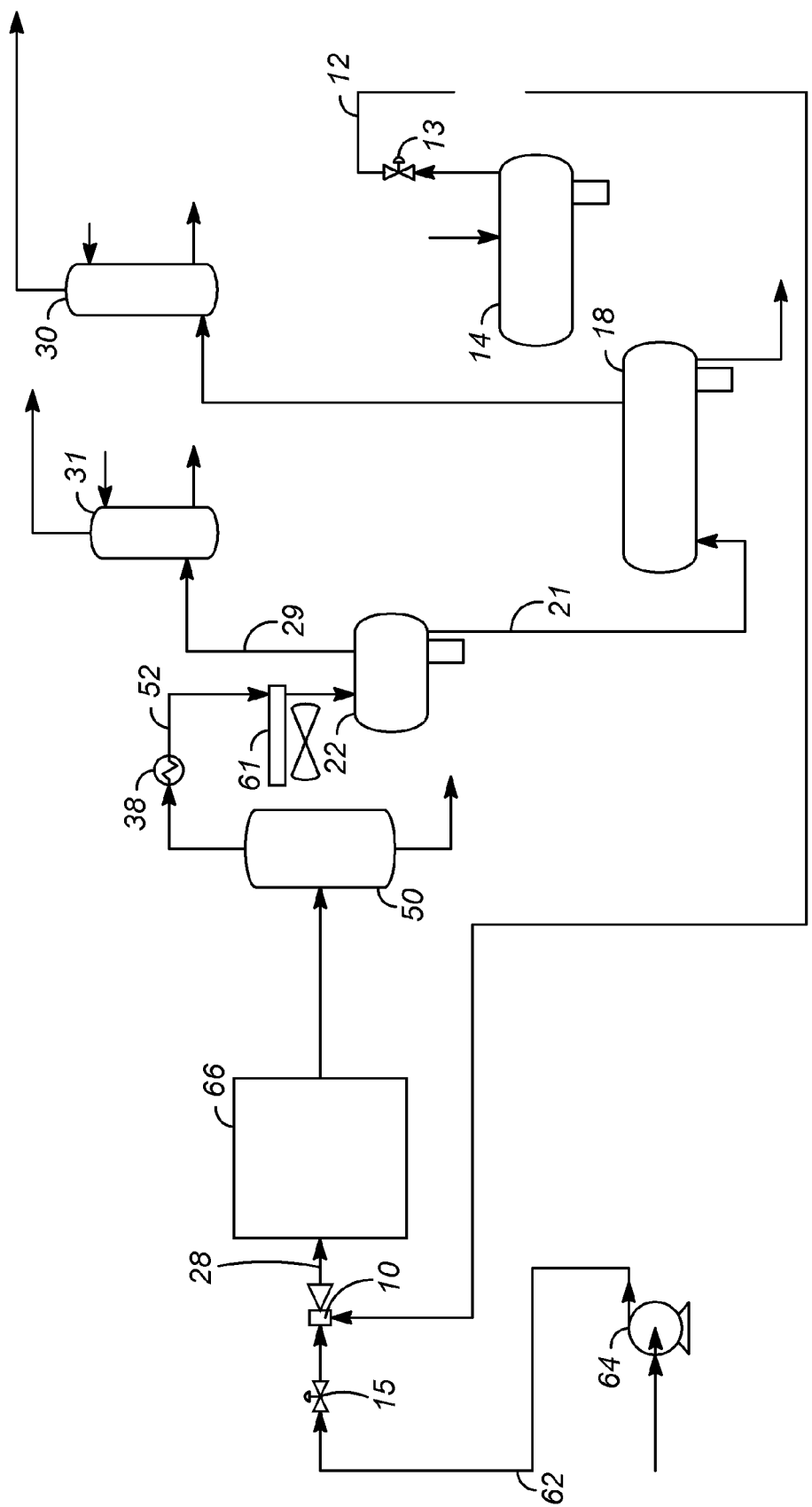
FIG. 11 is an illustration of a tenth embodiment of the present process shown using a thermocompressor.

FIG. 11 depicts still another embodiment. In the FIG. 11 embodiment, the hydrogen containing stripper overhead vapor stream 12 from the stripper receiver 14 is routed to a thermocompressor 10 at 150 psig. The stripper overhead vapor stream 12 is combined at the thermocompressor 10 with a high head pressure stream 62 fed from a feed charge pump 64. A control valve 13 is incorporated into the line for the stripper overhead vapor 12 stream before the thermocompressor 10 but after the stripper receiver 14. In addition, the line carrying the high head pressure stream 62 utilizes a control valve 15 at a location before the thermocompressor 10 but after the feed charge pump 64.

The resultant stream 28 is fed from the thermocompressor 10 to a reactor section 66. The resultant stream from the reactor section 66 is routed to a hot separator 50. The resultant stream 52 from the hot separator 50 is fed through a heat exchanger 38, a cooling device 61, and then to a cold separator 22. The cold separator liquid 21 is routed to a cold flash drum 18. The vast majority of the resultant stream from the cold flash drum 18 will pass overhead at a pressure of 450 psig and will be routed to an off-gas scrubber 30 to remove H$_2$S, and then will be routed to a PSA (not pictured), or a similar device, for hydrogen recovery. The heavier components remaining in the cold flash drum 18 will be routed to a fractionation section for further processing. This embodiment also includes a recycle gas scrubber 31 that receives the gas stream 29 from the cold separator 22.

Figure 12:
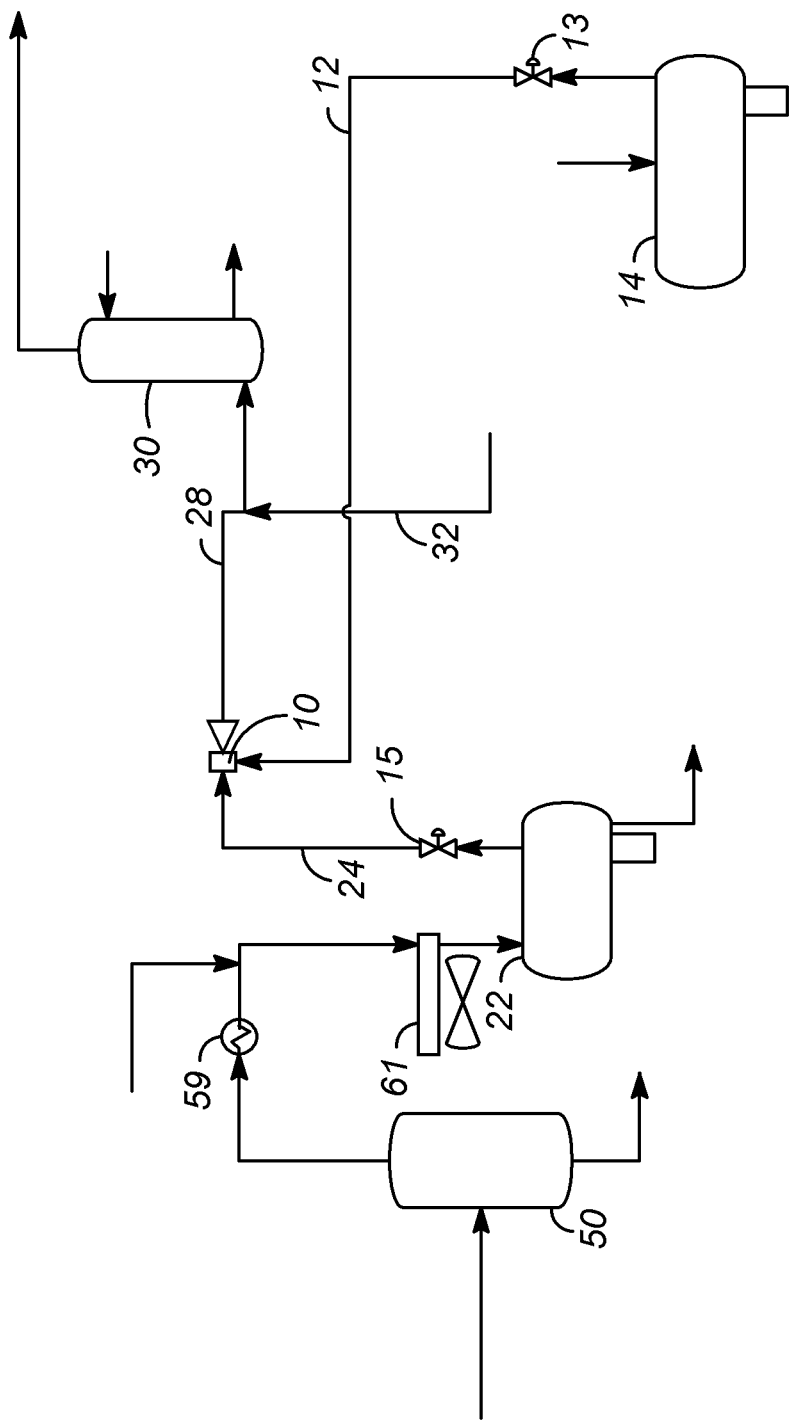
FIG. 12 is an illustration of a eleventh embodiment of the present process shown using a thermocompressor.

Another embodiment is shown in FIG. 12. The FIG. 12 embodiment is essentially the same as the FIG. 6 embodiment, except that the FIG. 12 embodiment lacks the RG purge feature. The FIG. 12 embodiment, like the FIG. 3 embodiment, is also a Hydrogen once-through (HOT) hydroprocessing system. Briefly, in the FIG. 13 embodiment, the hydrogen containing stripper overhead vapor stream 12 from the stripper receiver 14 is routed to a thermocompressor 10 at 150 psig. The stripper overhead vapor stream 12 is combined at the thermocompressor 10 with a high pressure stream 24 fed from a cold separator 22. The high pressure stream 24 maintains a pressure of approximately 2000 psig. A control valve 13 is incorporated into the line for the stripper overhead vapor 12 stream before the thermocompressor 10 but after the stripper receiver 14. In addition, the line that carries the high pressure stream 24 utilizes a control valve 15 at a location before the thermocompressor 10 but after the cold separator 22. The resultant stream 28 from the thermocompressor 10 is combined with a stream 32 from a cold flash drum (not pictured). The combined stream is routed to an off-gas scrubber 30 to remove H$_2$S and then to a PSA (not pictured), or similar device, for hydrogen recovery.

Figure 13:
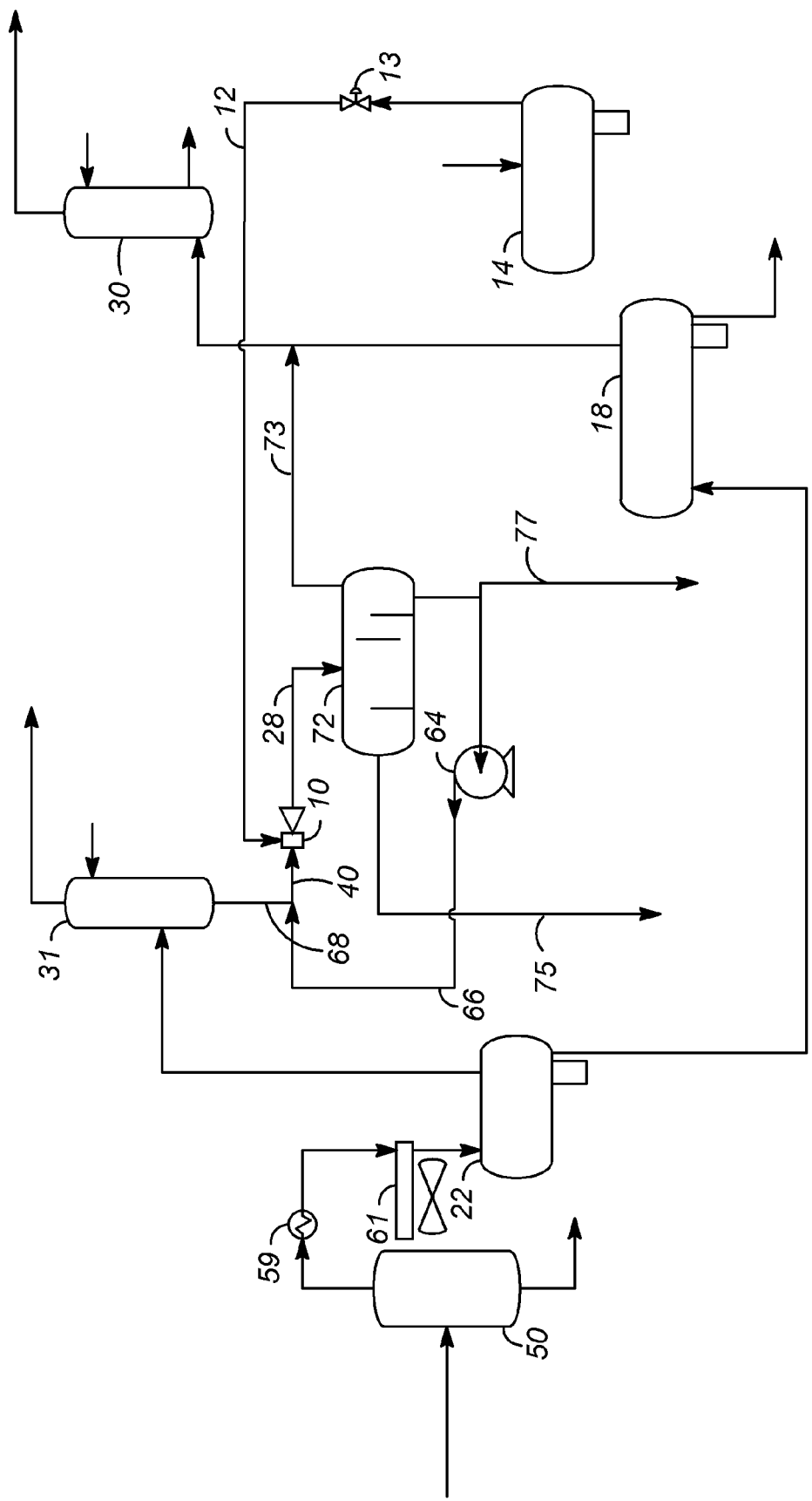
FIG. 13 is an illustration of an twelfth embodiment of the present process shown using a thermocompressor.

Another embodiment is shown in FIG. 13. In the FIG. 13 embodiment, the hydrogen containing stripper overhead vapor stream 12 from the stripper receiver 14 is routed to a thermocompressor 10 at 150 psig. The stripper overhead vapor stream 12 is met at the thermocompressor with a stream 40, which is the result of the combination of a semi-rich amine stream 66 and a rich amine stream 68. The semi-rich amine stream 66 is fed to the thermocompressor 10 by a feed charge pump 64, and the rich amine stream 68 is a resultant stream from a recycle gas scrubber 31. A control valve 13 is incorporated into the line for the stripper overhead vapor 12 stream at a location before the thermocompressor 10 but after the stripper receiver 14.

The resultant stream 28 from the thermocompressor 10 is routed to a flash drum 72, operating at medium pressures of approximately 450 psig. The resultant stream 73 from the flash drum 72 will pass overhead at a pressure of 450 psig, and will be routed to an off-gas scrubber 30 to remove H$_2$S and then to a PSA (not pictured), or a similar device, for hydrogen recovery. The heavier hydrocarbon components remaining in the flash drum 72 will be routed to the unit feed or refinery slops, via stream 75. The rich amine in the flash drum 72 will be routed to a regeneration unit via stream 77.

As described above, the present process specifically considers the application of thermocompression to hydrogen recovery from a traditional hydroprocessing stripper overhead. Other applications, as noted previously, may also be lucrative.

The processes described herein enable the recovery of hydrogen from a hydroprocessing unit's stripper off-gas. This off-gas is hydrogen rich (typically about 50 mol % H$_2$) and of substantial volume (about 20% of that deemed lucrative to recover from a hydroprocessing unit's cold flash drum off-gas). The hydrogen recovery described herein is believed to result in substantial operational cost-savings. Additionally, LPG recovery from the same stripper off-gas may also be increased, owing to the decreased volatility of LPG in the unit's cold flash drum. Further, unit capital cost may also decrease due to the elimination of equipment otherwise required to process the stripper off-gas.

In summary, the processes described herein provide one or more of the following features: (1) the ability to recover valuable hydrogen that is capable of being purified in a PSA; (2) decreased LPG and/or light naphtha losses to fuel gas; (3) the ability to utilize a normally lost pressure-drop from the cold separator to the cold flash drum (or other high-pressure to low-pressure transitions; (4) the potential to eliminate the need for equipment to process the low-pressure gas, such as scrubbers, sponge absorbers, etc. (5) a reduction of the unit's total hydrogen consumption (Net+Solubility to Fuel Gas+ Mechanical Losses); (6) a reduction of the loads on existing units and reduced new-design requirements of Steam-Methane Reforming Units, Catalytic Reforming Units, or other hydrogen generators; (7) possible increases in complex-wide efficiency and/or de-bottlenecking of a hydrogen-limited complex; (8) the applicability to the revamping of old units; and (9) increased flexibility in unit design. Depending on the system, low-pressure gas thermocompression may enable other novel process designs. The flexibility to recover hydrogen from a low-pressure system may also alleviate some upstream or high-pressure design constraints and could result in an overall more attractive unit design.

The processes described herein can also provide one or more of the following positive aspects: (1) Solubility losses to the fractionation section are somewhat limited by temperature and pressure, as opposed to equilibrium, so the potential for hydrogen and light-ends to recycle and build-up in this loop is limited. (2) Thermocompressors are inexpensive, comparable in cost to a control valve in the same service. (3) A design can utilize multiple thermocompressors in different configurations in order to custom-fit a unit's design needs. (4)

Thermocompression is nearly isothermal. (5) The low cost of thermocompressors can translate to a high return on investment rates.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

What is claimed is:

1. A process for recovering hydrogen during hydroprocessing, the process comprising:
   providing a pressure increasing device to a hydroprocessing unit, wherein the pressure increasing device utilizes a high pressure stream for increasing pressure;
   introducing a hydrogen containing stream to the pressure increasing device, thereby increasing the pressure of the hydrogen containing stream;
   routing the hydrogen containing stream from the pressure increasing device to a vapor-liquid separator; and
   separating the hydrogen from the hydrogen containing stream in a hydrogen purification unit to produce a recovered hydrogen stream.

2. The process of claim 1, wherein the pressure increasing device comprises a thermocompressor, and wherein the process further comprises using the recovered hydrogen stream from the hydrogen purification unit within the hydroprocessing unit.

3. The process of claim 1, wherein the pressure increasing device comprises a liquid jet ejector, and wherein the process further comprises using the recovered hydrogen stream from the hydrogen purification unit within the hydroprocessing unit.

4. The process of claim 1, wherein the high pressure stream is received from a separator.

5. The process of claim 4, wherein:
   the separator comprises one of a hot separator and a cold separator; and
   the vapor-liquid separator comprises one of a hot flash drum and a cold flash drum.

6. The process of claim 5, wherein:
   the hydrogen containing stream of the introducing step comprises an off-gas stream containing hydrogen from a stripper receiver; and
   the pressure increasing device utilizes a high pressure liquid stream for increasing pressure.

7. The process of claim 6, wherein:
   the high pressure liquid stream from the cold separator has a pressure of between approximately 100 Barg and approximately 160 Barg;
   the pressure of the off-gas stream from the stripper receiver has a pressure of between approximately 5 Barg and approximately 15 Barg; and
   the pressure of the hydrogen containing stream being routed to the cold flash drum has a pressure of between approximately 25 Barg and approximately 30 Barg.

8. The process of claim 6, wherein the off-gas stream containing hydrogen includes between approximately 25 mol % and approximately 75 mol % hydrogen.

9. The process of claim 2, wherein:
   the high pressure stream is received from a separator;
   the separator comprises one of a hot separator or a cold separator; and
   the vapor-liquid separator comprises one of a hot flash drum or a cold flash drum.

10. The process of claim 1, wherein the hydroprocessing unit is a hydrocracking unit.

11. The process of claim 1, wherein the hydroprocessing unit is a hydrotreating unit.

12. The process of claim 1, further comprising:
   amine treating the hydrogen containing stream from the vapor-liquid separator in an amine scrubber prior to routing the hydrogen containing stream to the hydrogen purification unit.

13. The process of claim 1, wherein the hydrogen purification unit comprises a pressure swing adsorption unit.

14. The process of claim 1, wherein the high pressure stream is received from a recycle gas scrubber.

15. A process for recovering hydrogen during hydroprocessing, the process comprising:
   providing a thermocompressor to a hydroprocessing unit, wherein the thermocompressor utilizes a high pressure liquid stream from a separator for increasing pressure;
   introducing an off-gas stream containing hydrogen from a stripper receiver to the thermocompressor, thereby increasing the pressure of the hydrogen containing stream;
   amine treating the hydrogen containing stream from the thermocompressor in an amine scrubber; and
   routing the hydrogen containing stream from the amine scrubber to a pressure swing adsorption unit to produce a recovered hydrogen stream.

16. The process of claim 15, further comprising:
   routing the hydrogen containing stream from the thermocompressor to a first liquid-vapor separator;
   routing the hydrogen containing stream from the first vapor-liquid separator to a second vapor liquid separator;
   routing the hydrogen containing stream from the second vapor-liquid separator to the amine scrubber for said amine gas treating; and
   using the recovered hydrogen stream from the pressure swing adsorption unit within the hydroprocessing unit.

17. The process of claim 15, wherein the second vapor-liquid separator is a cold flash drum.

18. A process for recovering hydrogen during hydroprocessing, the process comprising:
   providing a thermocompressor to a hydroprocessing unit, wherein the thermocompressor utilizes a high pressure liquid stream from a pump for increasing pressure;
   introducing an off-gas stream containing hydrogen from a stripper receiver to the thermocompressor, thereby increasing the pressure of the hydrogen containing stream;
   routing the hydrogen containing stream from the thermocompressor to a vapor-liquid separator;
   amine gas treating the hydrogen containing stream from the vapor-liquid separator in an amine scrubber; and
   routing the hydrogen containing stream from the amine scrubber to a pressure swing adsorption unit to produce a recovered hydrogen stream.

19. The process of claim 18, further comprising:
   routing the hydrogen containing stream from the vapor-liquid separator to a second vapor-liquid separator;
   routing the hydrogen containing stream from a second vapor-liquid separator to the amine scrubber for said amine gas treating; and
   using the recovered hydrogen stream from the pressure swing adsorption unit within the hydroprocessing unit.

20. The process of claim 18, further comprising:
   routing the resultant hydrogen containing stream from the thermocompressor to a first vapor-liquid separator;

routing the hydrogen containing stream from the first vapor-liquid separator to a second vapor-liquid separator;

routing the hydrogen containing stream from the second vapor-liquid separator to a third vapor-liquid separator; and routing the hydrogen containing stream from the third vapor-liquid separator to the amine scrubber for said amine gas treating.

* * * * *